United States Patent
Bongard

(10) Patent No.: US 6,394,927 B1
(45) Date of Patent: May 28, 2002

(54) LOCKING DIFFERENTIAL WITH IMPROVED TOOTH MESHING CONFIGURATION

(75) Inventor: Daniel Jason Bongard, Kew (AU)

(73) Assignee: ARB Corporation Limited, Kilsyth (AU)

( * ) Notice: Subject to any disclaimer, the term of this patent is extended or adjusted under 35 U.S.C. 154(b) by 0 days.

(21) Appl. No.: 09/690,779

(22) Filed: Oct. 17, 2000

(51) Int. Cl.[7] .............................................. F16H 48/24
(52) U.S. Cl. ...................................................... 475/231
(58) Field of Search ................................ 475/231, 230, 475/236, 344, 86; 74/459.5, 423

(56) References Cited

U.S. PATENT DOCUMENTS

| | | | | |
|---|---|---|---|---|
| 4,665,769 A | * | 5/1987 | Parsons ....................... | 475/174 |
| 4,759,232 A | | 7/1988 | Roberts | |
| 4,901,599 A | * | 2/1990 | Irwin .......................... | 475/230 |
| 4,959,043 A | * | 9/1990 | Klotz et al. .................. | 475/220 |
| 5,545,102 A | * | 8/1996 | Burgman et al. ........... | 475/230 |
| 5,591,098 A | | 1/1997 | Jones et al. | |
| 5,601,508 A | * | 2/1997 | Kuzevanov .................. | 475/231 |
| 5,868,643 A | * | 2/1999 | Teraoka et al. ............. | 475/252 |

FOREIGN PATENT DOCUMENTS

| | | | | | |
|---|---|---|---|---|---|
| JP | | 09079353 A | * | 3/1997 | ........... F16H/48/20 |

* cited by examiner

Primary Examiner—Rodney H. Bonck
Assistant Examiner—David D. Le
(74) Attorney, Agent, or Firm—Christensen O'Connor Johnson Kindness PLLC

(57) ABSTRACT

A locking differential including a differential carrier or housing 1 closed by a flange cap 2 engaging locking gear 2A, the housing 1 and flange cap 2 supporting side gears 10 and 11 which mesh with pinion gears 12 supported by cross shafts 8 and 9, the cross shafts engaging mounting holes in the housing 1, each pinion gear having an even number of teeth, and each side gear having a number of teeth which is a multiple of two where two pinions are at 180° to each other, three where three pinion gears are at 120° to each other, four where three or four pinion gears are at 90° to each other, or five where five pinions are at 72° to each other, the locking means further including a clutch gear 5 which slidably engages the locking gear 2A and the teeth on side gear 10 in the locked position, the cross shafts 8 and 9 being in a fixed relationship to the locking gear 2A.

4 Claims, 3 Drawing Sheets

LOCKING DIFFERENTIAL WITH IMPROVED TOOTH MESHING CONFIGURATION

This invention relates to locking differentials in which the meshing configuration of the teeth of the side gears and pinions of the locked differential are improved.

FIELD OF THE INVENTION

Background of the Invention

In our U.S. Pat. No. 4,759,232, Roberts, we have described an improved locking differential capable of remote pneumatic actuation and including a locking ring housed within the differential carrier around one of the bevel gears and connected to a piston actuator located around the other of the bevel gears and connected to the locking ring by a sleeve. This locking system has enjoyed significant commercial success since it provides a locking differential mechanism which can be fitted to an existing differential housing with minimal modification to allow the remote pneumatic operation.

As a result of the extremely confined space within the differential carrier, the actuator and locking ring have always needed to be located on opposite sides of the pinion gear which increases the manufacturing operations needed to produce the locking differential and increases the parts inventory by requiring a connecting sleeve between the locking ring and the actuator. This splitting of the locking mechanism has prevented the use of the same locking system on differentials of smaller dimensions since there is insufficient room between the other bevel gear and the differential carrier to house the actuator mechanism. Also, in some larger differentials the geometry of the differential carrier housing makes it impossible to locate a split locking mechanism of this type.

In our U.S. Pat. No. 5,591,098, we describe improvements in the earlier differential which overcome the above described problem. By providing a modified cover plate forming part of the differential carrier and shaped to house the locking means around the side gear supported by the cover plate, conversion to a locking differential is achieved in a simple and convenient manner which reduces the cost of the conversion and provides a particularly robust conversion for differentials of small dimensions.

While the differential described in the latter patent has also enjoyed commercial success, the meshing positions of the side gears and pinions of the differential are unpredictable when the differential is locked, thereby resulting in the risk of serious tooth damage in the event that locking occurs when the teeth are in an inappropriate meshing relationship. This leads to overdesign of the side gears and pinions with a consequential increase in manufacturing costs.

As depicted in FIGS. 1 and 2 of the accompanying drawings, a dynamic variation exists in the position of the moment of load transfer between any two involute gears in running mesh. The range of values $\chi_1$ to $\chi_2$ is equivalent to the inclusive radial coordinates that make up the total running surface of the gear. This would suggest that as two gears revolve under uniform load (torque) they undergo a distinct change in the amount and location of stress in the cross section of the load bearing teeth.

When one considers the relative moment of load transfer with respect to the root radius of the tooth profiles (as depicted by values $\chi_1$ and $\chi_2$ in FIGS. 1 and 2), an even far greater proportional variation of load moment in comparison to that depicted by $\chi_1$ and $\chi_2$ can be seen. As the root radius of the involute tooth profile is given as the weakest point on the profile (for any given involute pair of like material) then this moment must be considered to be the area of greatest concern to the static loading of involute gears.

The theory behind this concept suggests that since the torque loaded failure of the side gear/pinion gear combinations of the locking differentials described above typically occurs in the root radius of the pinion of a locked assembly, an advantage would be gained in controlling the rotary positions of gears in the locked state such that the best case of load transfer always exists with respect to the root radius of the pinion gear. Given this, and the static load diagrams FIGS. 1 and 2, it is suggested that the rotary relationship depicted by FIG. 2, would be the best position for the gears to be in while under heavy torque load, i.e. in every "locked" position in the assembly, the mid-plane of a tooth of the side gear bisects the angle created between the mid-planes of two teeth of the pinion gears The above theory has been tested using differentials manufactured by the assignee ARB Corporation Limited in accordance with U.S. Pat. No. 5,591,098: the RD15 Airlocker model differentials. The most common type of pinion tooth failure in such differentials when loaded in the "untimed" configuration of FIG. 1, is illustrated in FIG. 3 of the drawings.

SUMMARY OF THE INVENTION AND OBJECT

It is an object of the present invention to provide a locking differential having an improved side gear/pinion tooth configuration which reduces the likelihood of tooth damage when the differential is subjected to torque in the locked condition.

The invention provides a locking differential including a differential carrier housing a pair of bevel side gears and from two to five pinion gears which mesh with said pair of bevel side gears, locking means positioned within said differential carrier between said differential carrier and one of said bevel side gears, said locking means including locking teeth or splines adapted to engage teeth or splines on said one of said bevel gears to lock the differential, said side gears having teeth in multiples of two to five, depending on the angular positions of the axes of rotation of said pinions with respect to each other, said pinions being mounted on cross shafts, defining said axes of rotation, which are supported by the housing in a fixed position relative to the locking gear such that the teeth of the side gears and the pinion gears are substantially optimally meshed whenever the locking mechanism is in the locked position.

In a preferred embodiment of the invention, each side gear has the same number of teeth as the number of teeth or splines in the locking mechanism, and each pinion has an even number of teeth, and each side gear has a number of teeth which is a multiple of two, three, four or five depending on the angular positions of the axes of rotation of said pinions, the multiple two corresponding to pinions arranged at 180° to each other, the multiple three corresponding to pinions arranged at 120° to each other, the multiple four corresponding to pinions arranged at 90° to each other, the multiple five corresponding to pinions arranged at 72° to each other.

It is particularly preferred that the cross shafts are arranged in a fixed position with respect to the position of the locking teeth or splines of the locking mechanism.

The locking mechanism may be in the form of a sliding clutch gear having internal teeth which mesh with the teeth of one of the side gears. In this way, the provision of separate teeth or splines on the side gear is avoided thereby simplifying the side gear design.

BRIEF DESCRIPTION OF THE DRAWINGS

In order that the invention may be more readily understood, one presently preferred embodiment of the invention will be described with reference to the accompanying drawings in which.

DESCRIPTION OF PREFERRED EMBODIMENT

Figure 1:
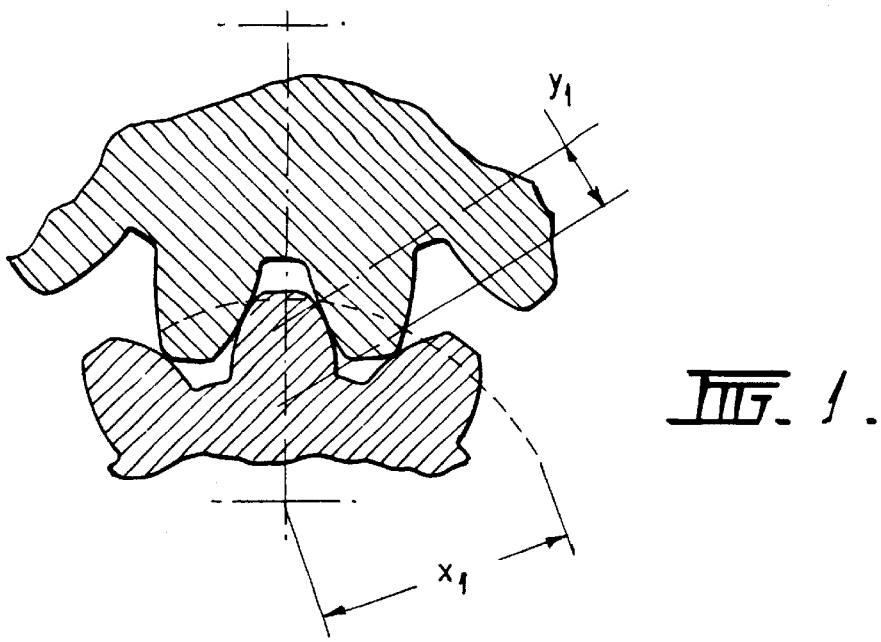
FIG. 1 is a fragmentary schematic diagram illustrating the "un-timed" meshing of the side gear and pinion teeth.

As described above, FIGS. 1 to 3 illustrate "un-timed" meshing between a side gear and a pinion gear, "timed" meshing between a side gear and a pinion gear and a common form of tooth failure in a gear tooth, respectively, the direction of tooth load being illustrated by the arrow.

Figure 4:
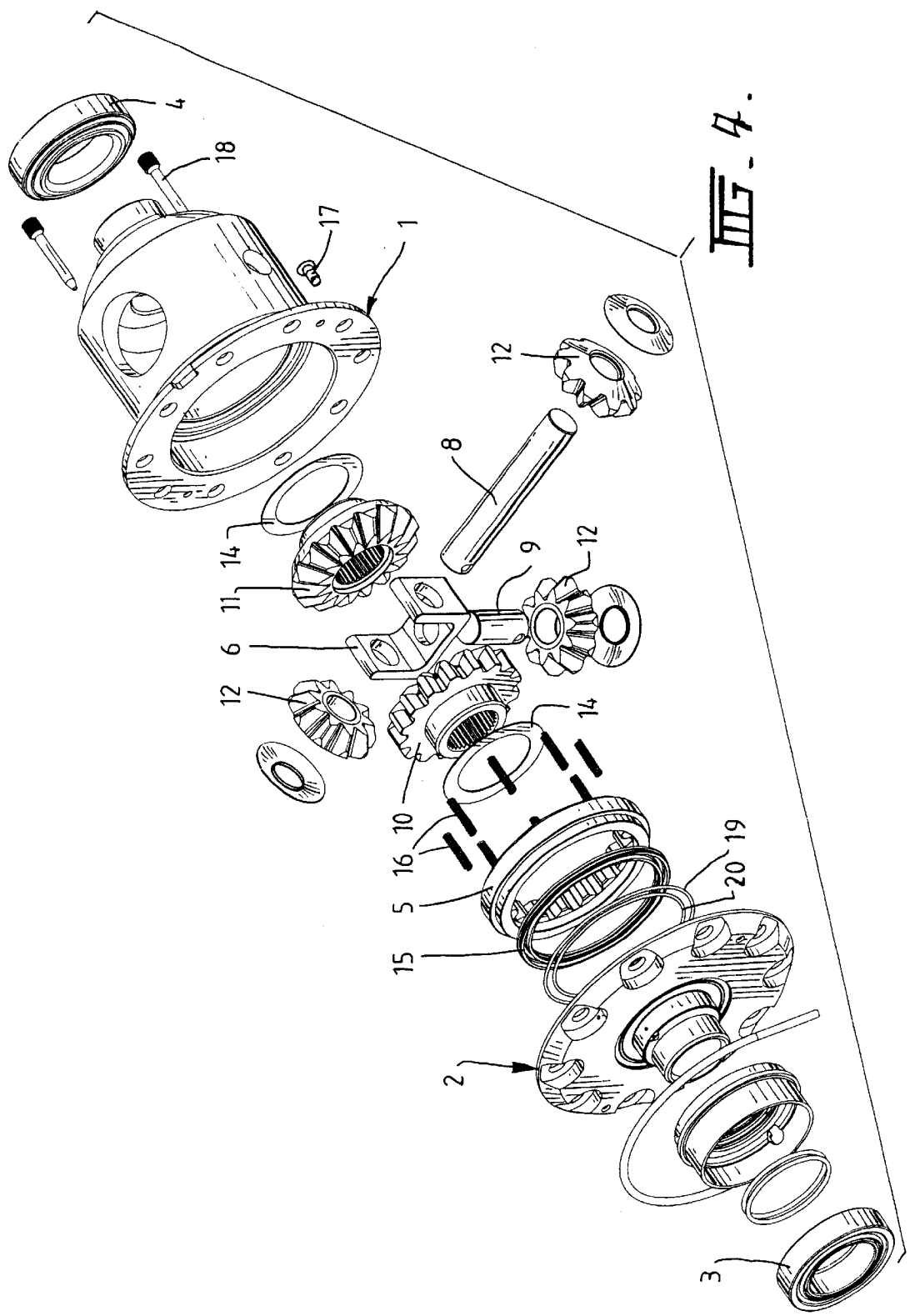
FIG. 4 is an exploded view of a locking differential embodying the present invention.
Figure 5:
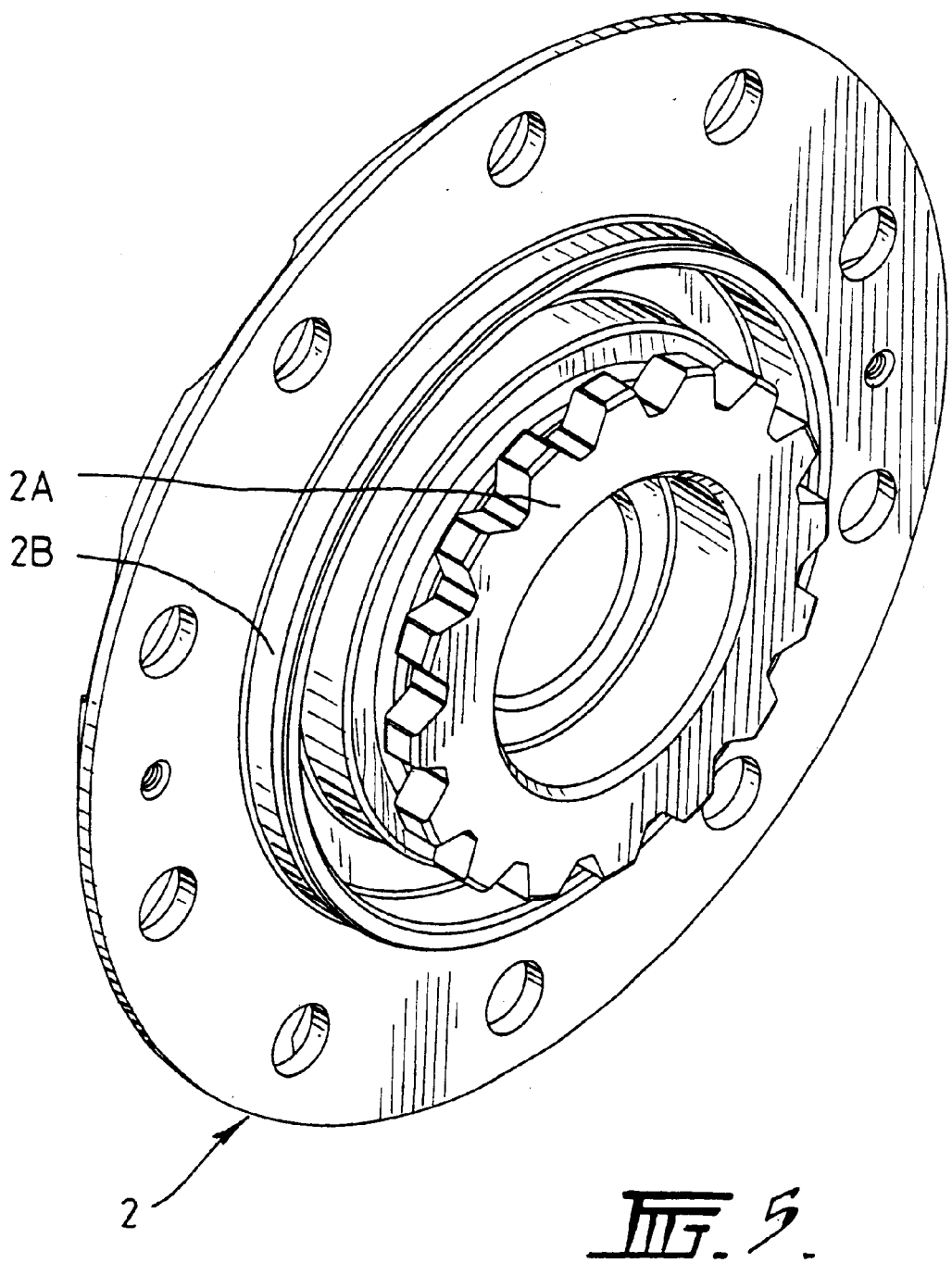
FIG. 5 is a perspective view of the other side of the flange cap of FIG. 4 showing the locking gear and actuating cylinder.

Referring now to FIGS. 4 and 5 of the drawings, a locking differential embodying the invention is illustrated in exploded perspective views. The differential includes a differential carrier or housing 1 and a flange cap 2 which is formed with locking gear 2A, as illustrated in FIG. 5. The flange cap 2 is secured by bolts (not shown) to the flange of the housing 1 to close the differential housing 1.

Thrust bearings 3 and 4 on the housing 1 and the flange cap 2 mount the housing 1 in a differential casing (not shown), and a clutch gear 5 slidably engages the locking gear 2A and is movable between the unlocked position and the locked position by means of an annular piston 15 against the action of clutch return springs 16. The flange cap 2 includes a cylinder structure 2B (FIG. 5) which receives the piston 15 and O-rings 19 and 20 to define a clutch activating piston and cylinder assembly. The piston 15 engages the adjacent face of the clutch gear 5 and pushes it into engagement with the teeth of side gear 10 against the action of the clutch return springs 16 whenever positive air pressure is present in the cylinder 2B. Air is introduced in a known manner through the flange cap 2 into the cylinder 2B to cause locking of the differential. When the air pressure is removed from the cylinder 2B, the clutch return springs 16 return the clutch gear 5 to the disengaged or rest position on the locking gear teeth 2A to thereby unlock the differential.

The housing 1 and the flange cap 2 support side gears 10 and 11 and pinion gears 12 are supported by cross shafts 8 and 9 engaging mounting holes in the housing 1 in the usual manner. Cross shaft 9 carries a spider block 6. The side gears 10 and 11 are biased into engagement with the pinion gears 12 by thrust washers 14 and the pinion gears 12 are similarly biased to engagement with the side gears 10 and 11 by thrust washers 14. Locking screws 17 locate the flange cap 2 correctly on the housing, and retaining pins 18 engage the housing 1 and the cross shafts 8 and 9 to lock the cross shafts 8 and 9 in the required position in relation to the housing 1.

In the present embodiment, there are three pinion gears 12 arranged at 90° to each other, and it will be noted that each pinion gear has ten teeth, while each side gear has sixteen teeth, an even number of teeth in each case. The number of teeth included in each side gear is a multiple of two, where two pinion gears are at 180° to each other, three, where three pinion gears are at 120° to each other, four, where three or four pinion gears are at 90° to each other, or five, where five pinions are at 72° to each other. By selecting the number of teeth in this way, and appropriately selecting the number of teeth on each pinion gear to match, proper matching of the side and pinion gear teeth is ensured at the position of locking.

The clutch gear 5 has the same number of internal teeth as the side gear 10, and when the clutch gear 5 is in the locked position, the internal teeth or splines of the clutch gear 5 engage the teeth of the side gear 10, which are open at the rear face for that purpose. By forming the side gear 10 in this way, the need for teeth or splines on the back of the side gear, as illustrated in the locking differential of U.S. Pat. No. 4,759,232, are eliminated thereby simplifying the differential and strengthening the locking relationship between the clutch gear 5 and the side gear 10.

Figure 2:
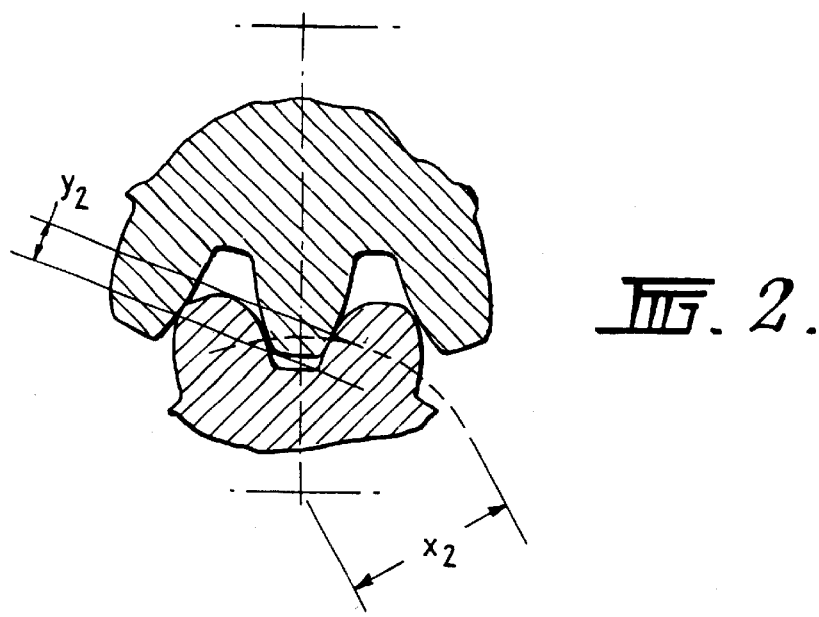
FIG. 2 is a schematic illustration of "timed" meshing of the side gear and pinion teeth.
Figure 3:
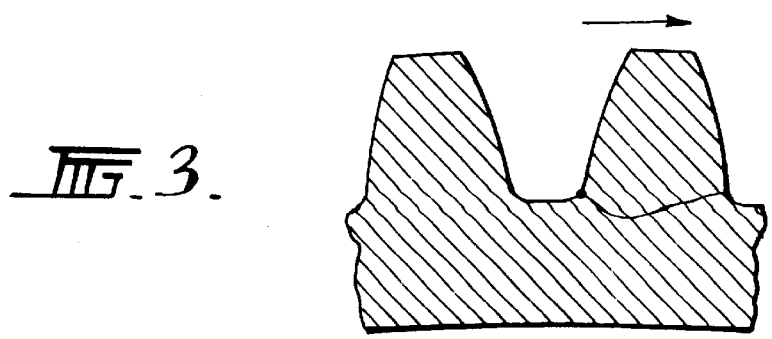
FIG. 3 schematically illustrates a common pinion tooth failure.

The cross shafts 8 and 9 are located by mounting holes 7A in the housing 1 in a fixed relative position to the position of the teeth of the locking gear 2A such that the pinions 12 are always optimally meshed with the side gears 10 and 11, in the manner illustrated in FIG. 2 of the drawings, whenever the clutch gear 5 is positioned to engage the teeth of the side gear 10 to lock the differential. In this way, whenever a load is applied to the differential in the locked state, the pinion and side gear teeth are always optimally meshed thereby avoiding the likelihood of pinion tooth failure of the type illustrated in FIG. 3 of the drawings, and avoiding the need to overdesign.

While the above described embodiment has three pinions, the number of pinions may vary between two and five. If two pinions are provided, they are in the mutually opposed positions of the pinions attached to cross-shaft 8, and if four pinions are provided, the fourth pinion is supported by an extended cross-shaft 9 in the mutually opposed position to the lowermost pinion 12 as illustrated in FIG. 4 of the drawings.

The number of side gear teeth are always in multiples of 2, 3, 4 or 5, depending on the angular positioning of the pinions. The side gears in the present embodiment have sixteen teeth, and the locking gear 2A has the same number of teeth, while the clutch gear 5 has an identical number of internal teeth so that it freely slides on the locking gear teeth to engage the teeth of the side gear 10 in the locked position.

I claim:

1. A locking differential including a differential carrier housing a pair of bevel side gears and from two to five pinion gears which mesh with said pair of bevel side gears, locking means positioned within said differential carrier between said differential carrier and one of said bevel gears, said locking means including locking teeth or splines adapted to engage teeth or splines on said one of said bevel gears to lock the differential, said side gears having teeth in multiples of two to five, depending on the angular positions of the axes of rotation of said pinions with respect to each other, said pinions being mounted on cross shafts, defining said axes of rotation, which are supported by the housing in a fixed position relative to said locking means such that the teeth of the side gears and the pinion gears are substantially optimally meshed whenever the locking means is in the locked position.

2. The locking differential of claim 1, wherein each side gear has the same number of teeth as the number of teeth or splines in the locking means.

3. The locking differential of claim 2, wherein the teeth of said locking means directly engage the teeth of said one of said side gears.

4. The locking differential of claims 1, 2 or 3, wherein each pinion has an even number of teeth and each side gear has a number of teeth which is a multiple of two, three, four or five depending on the angular positions of the axes of rotation of said pinions, the multiple two corresponding to pinions arranged at 180° to each other, the multiple three corresponding to pinions arranged at 120° to each other, the multiple four corresponding to pinions arranged at 90° to each other, and the multiple five corresponding to pinions arranged at 72° to each other.

* * * * *